April 19, 1927.
P. E. FENTON
SINGLE PIN SOCKET
Filed Feb. 4, 1927
1,625,303
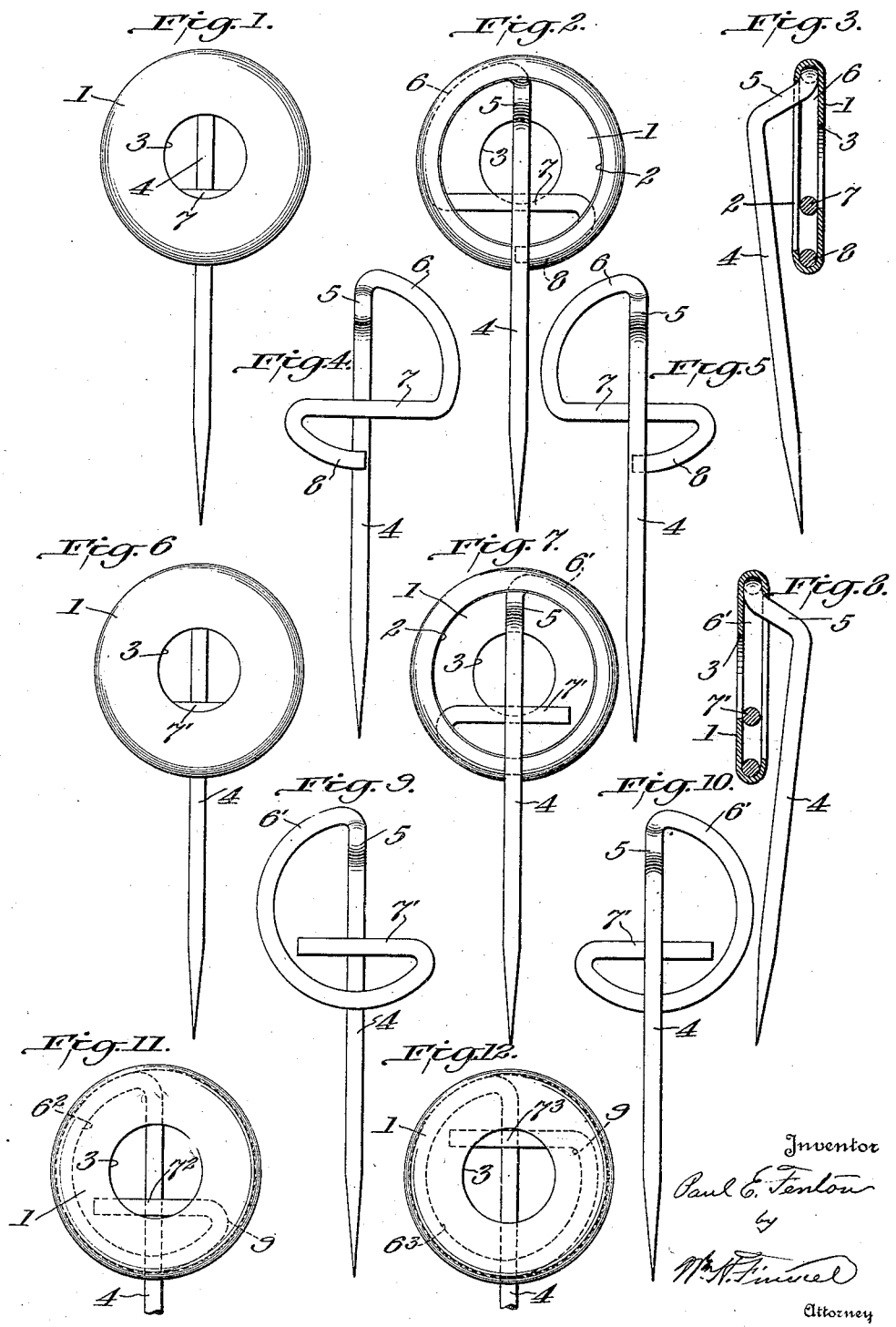

Patented Apr. 19, 1927.

1,625,303

UNITED STATES PATENT OFFICE.

PAUL E. FENTON, OF THOMASTON, CONNECTICUT, ASSIGNOR TO SCOVILL MANUFACTURING COMPANY, OF WATERBURY, CONNECTICUT, A CORPORATION OF CONNECTICUT.

SINGLE-PIN SOCKET.

Application filed February 4, 1927. Serial No. 165,983.

The object of this invention is to provide a socket member of a separable or snap fastener, in which a stick-pin is used to attach or set the device and a portion of the pin used as the spring element of the socket to engage a complemental stud member.

The invention consists of a pin member having a head bent in any of a variety of forms to provide, first, for mounting the shell element of the socket, and, second, to present a spring element in the socket for cooperation with the stud member, as I will proceed now to explain and finally claim.

Without thereby limiting the invention or its use, I will describe the same as constructed for use in securing covers to the upholstered parts of automobiles. In such case, the stud members will be permanently secured to the cover and the pin members will be stuck in the upholstered portion in such location as to register with the stud members in the attachment of the cover to the upholstered portion.

In the accompanying drawings illustrating the invention, in the several figures of which like parts are similarly designated, Figure 1 is a front view; Fig. 2 is a rear view, and Fig. 3 is a longitudinal section illustrating one embodiment of the invention. Fig. 4 is a front view and Fig. 5 is a rear view of the pin member detached. Fig. 6 is a front view; Fig. 7 is a rear view, and Fig. 8 is a longitudinal section illustrating another variation of the pin member, and Figs. 9 and 10 are front and rear views, respectively, of the pin member thereof detached. Figs. 11 and 12 are front views of two other variations of the pin member.

The shell 1 may be of sheet metal, having the rear rim flange 2 and the central stud-receiving hole 3. This shell is adapted to receive and engage a stick-pin upon which it is mounted and by means of which the device is removably secured to or set upon an article in such way as to be engaged by and disengaged from the stud member of the fastener.

The outer face or front of the shell, in which is arranged the stud-receiving hole 3, is flat so as to ensure a close fit of the parts, with a minimum of space occupied, to thereby enhance the efficiency of the engagement of the parts, as well as the appearance or finish of the arrangement, respectively.

The stud member may be of any of a variety of non-resilient or other well-known constructions, not shown here.

The pin is composed of the pointed element 4, having an offset 5 and the laterally extended curved element 6 to enter and be clamped by the rim flange 2, and the straight element 7 extending across the pin and having its free end 8 returned downwardly toward the pin and forming a segment of a circle, so that by means of the curved element 6 and this free end 8 the pin may be engaged with the flange of the shell and a secure union of the two made, excepting that there will be more or less motion of the element 8 within the flange in order to permit the exercise of the resilience of the element 7. This element 7 crosses the hole 3 so that when the stud is entered in said hole it will displace the element 7 until the usual circumferential groove in the stud comes opposite the element 7 which will then snap into the groove and thus hold the stud and pin in engagement.

Various modifications of the manner of utilizing the free end of the head of the pin are possible, some of which are illustrated herein. Referring to Figs. 6 to 10, the element 8 is omitted and the curved portion 6' is extended into a little more than a half circle, with the cross element 7' extending from the lower end of the curved portion. Referring to Fig. 11, the element $7^2$ extends a little more fully across the hole and the bend 9 of the curved element $6^2$ is drawn away from the bottom of the groove formed by the flanged rim of the shell, that is to say, is eccentric with relation thereto or to the shell so as to provide for an increase of resilience. As shown in Fig. 12 the curved end $6^3$ may be extended for about three-fourths of the circumference of a circle and the straight element $7^3$ may be bent back across the upper portion of the hole. In this form also the curved element stands off eccentrically from the bottom of the groove formed by the flange of the shell to increase the resilience.

It will be observed of the constructions shown in Figs. 6 to 12 and particularly those shown in Figs. 11 and 12 that the bends in the wire pin do not immediately touch the closed-over flange of the shell, but gradually approach the edge until they come into contact approximately just above the place where the crossed end of the pin head clears the edge of the shell. When the stud enters the socket, the spring yields or expands all the way to the spot where it bears against the inside of the shell. This gives more resilience than if the wire came in contact with the shell further up toward the crossed end.

Other variations than those described are permissible within the principle of the invention and the scope of the claims following.

What I claim is:—

1. A single pin socket, for snap fasteners, composed of a shell having a hole in its face to receive a stud member and provided with a rim flange, and a pin having a head provided with a laterally extending curved portion adapted to engage with the flanged shell to unite the shell and pin, said curved portion having a cross member extending toward the opposite side of the shell and crossing a portion of the hole in the shell and serving as a spring to engage the stud member.

2. A single pin socket, for snap fasteners, composed of a shell having a hole in its face to receive a stud member and provided with a rim flange, and a pin having a head provided with a laterally extending curved portion adapted to engage with the flanged shell to unite the shell and pin, said curved portion terminating in a cross member extending toward the opposite side of the shell and crossing a portion of the hole in the shell and serving as a spring to engage the stud member, the curvature of the curved member adjacent to the cross member being eccentric so as to be expansible within the shell to increase the resilience of the cross member in its engagement with and disengagement from the stud.

In testimony whereof I have hereunto set my hand this 1st day of February A. D. 1927.

PAUL E. FENTON.